United States Patent
Edwards

(10) Patent No.: US 10,204,115 B2
(45) Date of Patent: Feb. 12, 2019

(54) GENERATING A COMBINED DATA RECORD

(75) Inventor: Simon Edwards, London (GB)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 14/127,880

(22) PCT Filed: Jun. 22, 2012

(86) PCT No.: PCT/GB2012/051469
§ 371 (c)(1),
(2), (4) Date: Mar. 14, 2014

(87) PCT Pub. No.: WO2012/175992
PCT Pub. Date: Dec. 27, 2012

(65) Prior Publication Data
US 2014/0222838 A1     Aug. 7, 2014

(30) Foreign Application Priority Data

Jun. 24, 2011 (GB) .................................. 1110843.8
Nov. 2, 2011 (GB) .................................. 1118988.3
Dec. 20, 2011 (GB) .................................. 1122016.7

(51) Int. Cl.
*G06F 7/00* (2006.01)
*G06F 17/30* (2006.01)
(Continued)

(52) U.S. Cl.
CPC ...... *G06F 17/30241* (2013.01); *H04W 4/021* (2013.01); *H04W 4/185* (2013.01)

(58) Field of Classification Search
CPC ...... G06F 17/30; G06F 7/24; G06F 17/30595; G06F 17/30286; G06Q 30/02
See application file for complete search history.

(56) References Cited

U.S. PATENT DOCUMENTS

| 6,330,429 B1 * | 12/2001 | He ........................ H04W 16/00 |
| | | 455/134 |
| 8,064,894 B1 * | 11/2011 | Bill ........................ G06Q 10/10 |
| | | 370/395.3 |

(Continued)

FOREIGN PATENT DOCUMENTS

| WO | WO2004102855 | 11/2004 |
| WO | WO2006009385 | 1/2006 |

OTHER PUBLICATIONS

PCT International Search Report dated Oct. 17, 2012, PCT Patent Application PCT/GB2012/051469.

(Continued)

*Primary Examiner* — Sherief Badawi
*Assistant Examiner* — Lahcen Ennaji
(74) *Attorney, Agent, or Firm* — Vierra Magen Marcus LLP

(57) ABSTRACT

A terminal supporting apparatus 10 supports at least one of two ends of a control cable having an inner cable and an outer cable. The terminal supporting apparatus 10 includes: a hub 12 attached to an end of the outer cable, and having a flange on an outer periphery thereof; a cushion member 14 disposed to surround the outer periphery of the hub, and being in contact with the flange at both a front surface and a rear surface of the flange; and a housing 17 having a housing part that houses the cushion member. When an angle formed between an axis of the housing part and an axis of the hub is varied in a range of 0.0° to 6.0°, a diagonal static spring constant of the cushion member in an axial direction thereof may be in a range of 350 to 600 N/mm.

25 Claims, 4 Drawing Sheets

(51) Int. Cl.
*H04W 4/021* (2018.01)
*H04W 4/18* (2009.01)

(56) References Cited

U.S. PATENT DOCUMENTS

| | | | | |
|---|---|---|---|---|
| 2005/0278371 | A1 | 12/2005 | Funk et al. | |
| 2007/0282526 | A1* | 12/2007 | Smith | G01C 21/005 |
| | | | | 701/439 |
| 2009/0037414 | A1 | 2/2009 | Olivier et al. | |
| 2009/0248833 | A1* | 10/2009 | Frazier | G06F 17/30041 |
| | | | | 709/217 |
| 2010/0056183 | A1* | 3/2010 | Oh | H04L 12/1818 |
| | | | | 455/456.3 |
| 2010/0268717 | A1* | 10/2010 | Pilskalns | G06Q 30/02 |
| | | | | 707/754 |
| 2012/0005203 | A1* | 1/2012 | Brzozowski | G06F 17/30867 |
| | | | | 707/732 |

OTHER PUBLICATIONS

Office Action dated Jul. 22, 2014 in UK Patent Application No. GB1211155.5, 2 pages.
Combined Search and Examination Report dated Oct. 1, 2012 in UK Patent Application No. GB1211155.5, 7 pages.
PCT International Search Report and Written Opinion dated Oct. 17, 2012 in PCT Patent Application PCT/GB2012/051469, 8 pages.
Search Report dated Oct. 28, 2011 in UK Patent Application No. GB1110843.8, 3 pages.
Examination Report dated Dec. 24, 2013 in UK Application No. GB1211155.5, 2 pages.

* cited by examiner

GENERATING A COMBINED DATA RECORD

The present invention relates to methods and apparatus for generating combined data records for the purpose of publication or display.

Comment boards and forums on websites allow users to provide data records or "posts" (e.g. text comments, audio, images or videos) related to a particular subject or event (e.g. an item of news). A user's initial data record for a particular subject or event can be added to by other users "posting" related contributing data records so as to build up a combined data record or "thread" for that subject or event. Other users can then view a published version of the combined data record for the subject or event.

Such systems are advantageous in that they allow a large number of users to contribute to the combined data record for a particular subject or event. This can increase the amount of information available to users for that particular subject or event.

However, such systems have a number of drawbacks and are open to abuse. For example, users may be able to post data records that contain information unrelated to the initial data record posted or unrelated to the particular subject or event in question. Furthermore, users may post data records that contain incorrect or inaccurate information because the user does not know enough about the particular subject or was not present at the particular event.

Moreover, a large number of different threads relating to the same subject or event can be created, where those different threads are derived from different initial posts. In this situation, users looking for information pertaining to the particular subject or event may become overwhelmed by the large number of different, but essentially related, combined data records (threads).

The problems of the known systems can be addressed by a moderator. The moderator may review the data records as they are provided by users. However, where there are a large number of data records, the moderator may not be able to review all of the data records quickly enough. There can, therefore, be a delay between a data record being provided by a user and then being published by the moderator.

A comment board or forum may also or instead rely on users reporting to a moderator any unrelated, incorrect or inaccurate data records that have already been published. However, there is a period of time where unrelated or inaccurate data records are published that may mislead other users. Furthermore, this approach relies on user input and is therefore itself open to abuse.

Moreover, these known approaches are ultimately reliant on a human or computerised moderator that has to judge the relevance or accuracy of a data record based solely on the content of the data record and/or the reputation of the user that provided the data record.

Accordingly, it can sometimes be difficult for the moderator to assess which data records to include or retain in a combined data record for a particular subject so as to give an accurate combined date record.

In the known systems there is also a requirement for sufficient data storage in order to temporarily store the unrelated or inaccurate data records for the period of time before moderation, or for storing different combined data records (threads) relating to the same subject or event. There is also a requirement for sufficient processing capability in order to process the unrelated or inaccurate data records.

Thus, a technical problem exists in dealing both quickly and accurately with a large number of contributing data records that can arise in response to a popular or controversial subject or event. This is a particular problem nowadays because a large number of electronic devices (e.g. computers, laptops, tablets, PDAs, mobile phones etc.) can be used to post data records over a short period of time and from any geographical location in response to a given event.

Accordingly, the Applicant believes that there remains scope for providing an improved way of generating combined data records for publication or display.

According to an aspect of the present invention there is provided a method of generating a combined data record for publication or display in a system in which a plurality of electronic devices can each provide a data record, the method comprising;

forming a combined data record for publication or display from two or more data records, wherein inclusion of a data record in the combined data record is based on the geographical location of the electronic device that provided that data record.

According to another aspect of the present invention there is provided an apparatus for generating a combined data record for publication or display in a system in which a plurality of electronic devices can each provide a data record, the apparatus comprising:

means for forming a combined data record for publication or display from two or more data records, wherein inclusion of a data record in the combined data record is based on the geographical location of the electronic device that provided that data record.

According to another aspect of the present invention there is provided a system for generating a combined data record for publication or display, the system comprising:

a plurality of electronic devices for providing data records; and means for forming a combined data record for publication or display from two or more data records, wherein inclusion of a data record in the combined data record is based on the geographical location of the electronic device that provided that data record.

The present invention provides arrangements in which data records are combined for publication or display based on the geographical location, for example (and as will be discussed further below) the proximity, of the electronic devices of the system.

The present invention can therefore be used to restrict the number of data records that can be included in the combined data record based on the geographical location of the electronic devices of the system.

For example, in response to an event, data records that are provided by electronic devices that have a particular geographical location may be combined for the purpose of publication or display, e.g., in preference to data records that might be provided by other electronic devices. For example, electronic devices that have particular geographical locations may be allowed to generate and/or provide data records for the combined data record, whereas some or all other electronic devices of the system may be prevented from generating and/or providing data records for the combined data record.

Similarly, where an initial data record is provided (e.g. in response to an event), contributing data records that are subsequently provided by electronic devices that are close to the event and/or to the initiating electronic device may be combined with an initial data record for the purpose of publication or display, e.g., in preference to data records that might be provided by electronic devices that are further away from the event and/or the initiating electronic device. For example, electronic devices that are close to the event and/or to the initiating electronic device may be allowed to generate and/or provide data records for the combined data record, whereas some or all other electronic devices that are further away from the event and/or the initiating electronic device may be prevented from generating and/or providing data records for the combined data record.

Since the selection of which data records to combine for publication or display is based on the geographical location, e.g. proximity, of electronic devices, the relevance and accuracy of the data records that are included in the combined data record can be improved. For example, users of electronic devices that have a particular geographical location close to an event are more likely to have witnessed the event themselves and can provide a better account of the event. Similarly, users of electronic devices that are in closer proximity to a user of an initiating electronic device are more likely to have witnessed the same events as the user of the initiating electronic device, and/or are more likely to be able to comment accurately on the validity or otherwise of data records (i.e. act as a moderator).

The present invention therefore provides arrangements which can solve the technical problem of selecting from the large number of potentially contributing electronic devices and/or potentially contributing data records that can arise in response to an event both quickly and accurately. The present invention can, therefore, also be used to provide arrangements that require less data storage by only receiving or retaining a reduced set of more relevant data records for a combined data record.

The manner in which data records are provided for inclusion in the combined data record can be achieved in any desired and suitable way.

In some embodiments, a data record is provided and then it is determined that that data record qualifies to be included in the combined data record. In other embodiments, it is determined that an electronic device is able to provide a data record that qualifies to be included in the combined data record and then that electronic device is allowed to generate and/or provide a data record. In other embodiments, a combination of these processes may be employed.

Accordingly, in some embodiments, a data record is provided by an electronic device, and then it is determined that the geographical location of that electronic device is such that that data record qualifies to be included in the combined data record. In these arrangements, data records that are provided by electronic devices which are determined to have non-qualifying geographical locations may still be generated and/or provided but those data records are not included in the combined data record.

Thus, according to another aspect of the present invention there is provided a method of generating a combined data record for publication or display in a system in which a plurality of electronic devices can each provide a data record, the method comprising;
    forming a combined data record for publication or display from two or more data records by selectively including and/or not including a data record in the combined data record based on the geographical location of the electronic device that provided that data record.

According to another aspect of the present invention there is provided an apparatus for generating a combined data record for publication or display in a system in which a plurality of electronic devices can each provide a data record, the apparatus comprising:
    means for forming a combined data record for publication or display from two or more data records by selectively including and/or not including a data record in the combined data record based on the geographical location of the electronic device that provided that data record.

According to another aspect of the present invention there is provided a system for generating a combined data record for publication or display, the system comprising:
    a plurality of electronic devices for providing data records; and
    means for forming a combined data record for publication or display from two or more data records by selectively including and/or not including a data record in the combined data record based on the geographical location of the electronic device that provided that data record.

In other embodiments, it is first determined that the geographical location of an electronic device is such that a data record which is to be provided by that electronic device would qualify for inclusion in the combined data record, and then that electronic device is allowed to generate and/or provide a data record for inclusion in the combined data record. In these arrangements, electronic devices that are determined to have non-qualifying geographical locations may be prevented from providing data records for inclusion in the combined data record and/or may be prevented from generating data records for inclusion in the combined data record.

Thus, according to another aspect of the present invention there is provided a method of generating a combined data record for publication or display in a system in which a plurality of electronic devices can each provide a data record, the method comprising;
    selectively allowing an electronic device to generate and/or provide a data record for inclusion in a combined data record based on the geographical location of that electronic device; and/or
    selectively preventing an electronic device from generating and/or providing a data record for inclusion in a combined data record based on the geographical location of that electronic device.

According to another aspect of the present invention there is provided an apparatus for generating a combined data record for publication or display in a system in which a plurality of electronic devices can each provide a data record, the apparatus comprising:
    means for selectively allowing an electronic device to generate and/or provide a data record for inclusion in a combined data record based on the geographical location of that electronic device; and/or
    means for selectively preventing an electronic device from generating and/or providing a data record for inclusion in a combined data record based on the geographical location of that electronic device.

According to another aspect of the present invention there is provided a system for generating a combined data record for publication or display, the system comprising:
    a plurality of electronic devices for providing data records; and
    means for selectively allowing an electronic device to generate and/or provide a data record for inclusion in a combined data record based on the geographical location of that electronic device; and/or
    means for selectively preventing an electronic device from generating and/or providing a data record for inclusion in a combined data record based on the geographical location of that electronic device.

Preferably, the data records in the combined data record comprise an initial data record that is provided by an initiating electronic device (which starts the "thread") and one or more contributing data records that are subsequently provided by one or more contributing electronic devices (which add to the "thread").

Preferably, the inclusion of a data record in the combined data record is also based on the geographical location of an event (an "event location") or the geographical location of an initiating electronic device that provides the initial data record to which subsequent contributing data records are added.

For example, and preferably, the inclusion of a data record in the combined data record may be based on the proximity of the electronic device that provides the contributing data record to an event location and/or to an initiating electronic device that provides an initial data record.

Thus, according to another aspect of the present invention there is provided a method of generating a combined data record for publication or display in a system in which an initiating electronic device can provide an initial data record and one or more contributing electronic devices can each provide a subsequent contributing data record, the method comprising:

forming a combined data record for publication or display from an initial data record and one or more subsequent contributing data records, wherein inclusion of a subsequent contributing data record in the combined data record is based on the proximity of the contributing electronic device that provided the subsequent contributing data record to an event location and/or to the initiating electronic device.

According to another aspect of the present invention there is provided an apparatus for generating a combined data record for publication or display in a system in which an initiating electronic device provides an initial data record and one or more contributing electronic devices each provide a subsequent contributing data record, the apparatus comprising:

means for forming a combined data record for publication or display from an initial data record and one or more subsequent contributing data records, wherein inclusion of a subsequent contributing data record in the combined data record is based on the proximity of the contributing electronic device that provided the subsequent contributing data record to an event location and/or to the initiating electronic device.

According to another aspect of the present invention there is provided a system for generating a combined data record for publication or display comprising:

an initiating electronic device for providing an initial data record;

one or more contributing electronic devices for providing subsequent contributing data records; and means for forming a combined data record for publication or display from an initial data record and one or more subsequent contributing data records, wherein inclusion of a subsequent contributing data record in the combined data record is based on the proximity of the contributing electronic device that provided the subsequent contributing data record to an event location and/or to the initiating electronic device.

In some embodiments, any data records that are not included in the combined data record are discarded. For example, the data records that are not included in the combined data record may be deleted from the system (e.g. not retained in memory) and/or are not published or displayed.

Thus, in some embodiments, the preset invention comprises steps of or means for selectively discarding data records, wherein the selective discarding of a data record is based on the geographical location of the electronic device that provided the data record.

Similarly, in some embodiments, the preset invention comprises steps of or means for selectively discarding contributing data records, wherein the selective discarding of a contributing data record is based on the proximity of the contributing electronic device that provided the contributing data record to an event location and/or to the initiating electronic device.

Alternatively, as discussed above, an electronic device may actually be prevented from generating and/or providing a contributing data record for a combined data record.

Thus, according to another aspect of the present invention there is provided a method of generating a combined data record for publication or display in a system in which an initiating electronic device can provide an initial data record and one or more electronic devices can each provide a subsequent data record, the method comprising:

selectively allowing an electronic device to generate and/or provide a subsequent contributing data record for inclusion in a combined data record based on the proximity of that electronic device to an event location and/or to the initiating electronic device; and/or selectively preventing an electronic device from generating and/or providing a subsequent contributing data record for inclusion in a combined data record based on the proximity of that electronic device to an event location and/or to the initiating electronic device.

According to another aspect of the present invention there is provided an apparatus for generating a combined data record for publication or display in a system in which an initiating electronic device can provide an initial data record and one or more electronic devices can each provide a subsequent data record, the apparatus comprising:

means for selectively allowing an electronic device to generate and/or provide a subsequent contributing data record for inclusion in a combined data record based on the proximity of that electronic device to an event location and/or to the initiating electronic device; and/or selectively preventing an electronic device from generating and/or providing a subsequent contributing data record for inclusion in a combined data record based on the proximity of that electronic device to an event location and/or to the initiating electronic device.

According to another aspect of the present invention there is provided a system for generating a combined data record for publication or display comprising:

an initiating electronic device for providing an initial data record;

one or more electronic devices for providing subsequent data records; and means for selectively allowing an electronic device to generate and/or provide a subsequent contributing data record for inclusion in a combined data record based on the proximity of that electronic device to an event location and/or to the initiating electronic device; and/or selectively preventing an electronic device from generating and/or providing a subsequent contributing data record for inclusion in a combined data record based on the proximity of that electronic device to an event location and/or to the initiating electronic device.

The geographical location or proximity of the electronic devices can be determined in any desired and suitable way.

Preferably, the geographical location or proximity of the electronic devices is determined by means that cannot easily be falsified, such that the geographical locations of the electronic devices are more likely to be genuine.

For example, the geographical location of the electronic devices may be determined by means other than user input, e.g. by one or more of the following: a global positioning system (GPS) provided as part of an electronic device, identifying the mobile communication cell or cells containing the electronic device, triangulation using wireless transmitters, and identifying the IP address of the electronic device.

In less preferred embodiments, the geographical locations of the electronic devices may be indicated, for example, by user input to the electronic device.

Preferably, the combined data record is associated with a title. Preferably, the title is provided (e.g. published or displayed) before any data records are combined to give the combined data record. The title may, therefore, indicate the subject or event to which the combined data record is intended to relate. The title for the combined data record may be updated or replaced later on. For example, the title may be changed based on the contents of the data records that are actually combined to give the combined data record. In these embodiments, the title may be considered as being the initial data record to which contributing data records are added to provide the combined data record.

Alternatively, the title for the combined data record may only be provided once data records have been combined to give the combined data record. For example, the title may be based on the contents of the data records that are combined to give the combined data record.

Preferably, the generation, provision and/or inclusion of a data record in the combined data record is based on whether or not the geographical location of the electronic device that is to provide the data record is within a particular defined geographical area. That area can be thought of as being a "contribution area" for the combined data record. Thus, a data record is preferably generated, provided and/or included in the combined data record if (and only if) the geographical location of the electronic device that provided the data record is determined to be within (or have been within) the defined contribution area.

Preferably, the title for the combined data record as discussed above is associated with the contribution area, i.e. the defined contribution area for a combined data record is given a title. As discussed above, the title may indicate the subject or event to which the combined data record (and therefore the contribution area) relates.

The contribution area can be defined in any desired or suitable way. For example, the contribution area may include geographical locations within a predetermined distance of a given location or position (such as the geographical location of an event) or within a predetermined distance of an electronic device (such as the initiating electronic device).

For example, the contribution area may be defined by a geographical location or geographical locations and a predetermined distance from the location or locations. The predetermined distance is preferably less than 5 km, more preferably less than 2 km, and most preferably less than 1 km.

The contribution area may also or instead comprise geographical locations within a predetermined distance of a geographical location that is intermediate two or more electronic devices (such as the initiating electronic device and/or contributing electronic devices). These embodiments are particularly advantageous, for example when the geographical location of an event or the initiating electronic device is unknown or has been lost.

Preferably, the geographical location that is intermediate two or more of the electronic devices is calculated based on the average locations of the devices (e.g. the mean average co-ordinates of those electronic devices). As will be appreciated, the average location may be considered as being an approximation of the geographical location of the event to which the data records provided by the electronic devices relate. The average location may be calculated once, or may be recalculated periodically or intermittently as more data records from more electronic devices are provided.

The contribution area may also or instead include geographical locations that are in a given direction from a geographical location. For example, the contribution area may comprise geographical locations that are north of a geographical location (i.e. north of a line that runs perpendicular to the north direction (i.e. that runs east to west) through the geographical location). The given direction can be any compass direction or bearing.

The contribution area may also or instead be, and in a preferred embodiment is, based on the geographical location of an event or first electronic device of the system (e.g., and preferably, an initiating electronic device) and the distance to a second electronic device of the system (e.g., and preferably, the electronic device that is nearest to the event/first electronic device). The distance between the event/first electronic device and the second electronic device of the system may be determined in any desired and suitable way, e.g. from the respective geographical locations of the event/first electronic device and the second electronic device.

In these embodiments, the contribution area may include, for example, geographical locations within an area centred on the geographical location of the event/first electronic device and having a radius equal to the distance from the event/first electronic device to the second electronic device, preferably plus a selected, preferably predetermined, additional distance.

The predetermined additional distance may be a distance value less than 5 km, more preferably may be a distance value less than 2 km, and most preferably may be a distance value less than 1 km.

Alternatively, the selected additional distance may be a percentage of the distance between the event/first electronic device and the second electronic device. The percentage may be a percentage value less than 20%, more preferably may be a percentage value less than 10%, and most preferably may be a percentage value less than 5%.

These embodiments are advantageous in that the defined contribution area encompasses at least one electronic device (i.e. the second electronic device) that qualifies to contribute data records to the combined data record for the contribution area. These embodiments can therefore reduce or avoid the occurrence of situations in which a defined contribution area does not encompass any electronic devices that may potentially contribute to the combined data record. However, it is not necessary that that at least one electronic device actually contributes a data record to the combined data record as there may be other electronic devices within (or that move so as to be within) the defined contribution area that can contribute data records to the combined data record.

In these embodiments, there may also be a maximum and/or minimum distance that is used to define the contribution area. For example, if the nearest electronic device to the event/first electronic device is more than the maximum distance from the event/first electronic device, then the maximum distance may be used to define the contribution area. Similarly, if the nearest electronic device to the event/first electronic device is less than the minimum distance from the event/first electronic device, then the minimum distance may be used to define the contribution area.

The maximum distance may be a distance value greater than 200 km, more preferably a distance value greater than 400 km, and most preferably a distance value greater than 800 km. The minimum distance is preferably a distance value less than 5 km, more preferably a distance value less than 2 km, and most preferably a distance value less than 1 km.

The contribution area may also or instead be defined, for example, in terms of one or more mobile communications cells (which includes and/or is within a certain predetermined distance of the event and/or initiating electronic device), in terms of three or more geographical locations that define a regular or irregular polygon, in terms of a regular or irregular shape drawn on a digitized map, or any other desired or suitable manner.

The contribution area may comprise a plurality of sub contribution areas. The sub contribution areas can be overlapping or non-overlapping, and can be defined in any desired or suitable way, e.g., using one or more of any of the techniques for defining contribution areas described above.

In some embodiments, as discussed above, the contribution area encompasses and/or is based on the geographical location of an initiating electronic device and/or of another electronic device of the system. In some embodiments, however, the contribution area may be defined without reference to the geographical position of an initiating electronic device and/or of any other electronic device of the system.

In embodiments in which the contribution area is based on (e.g. centred on) the geographical location of an initiating electronic device and/or of another electronic device of the system, the geographical location used to define the contribution area may either be the geographical location of the initiating electronic device and/or other electronic device of the system at the time the initial data record is provided or the current geographical location of the initiating electronic device and/or other electronic device of the system. As will be appreciated, if the current geographical location of the initiating electronic device and/or other electronic device of the system is used as the basis for the contribution area, the contribution area can move and/or increase/decrease in size if and when the initiating electronic device and/or other electronic device of the system moves.

Preferably, the contribution area is defined at the time the initial data record is provided and/or before any contributing data records are provided. In these embodiments, as the contribution area is already defined, any subsequent contributing data records that are provided by electronic devices that are outside of the contribution area may immediately be discarded or any electronic devices that are outside of the contribution area may immediately be prevented from generating and/or providing contributing data records for inclusion in the combined data record.

Alternatively, the contribution area may be defined after contributing data records have been already been provided. In some embodiments, any contributing data records provided by electronic devices that were outside of the contribution area may be discarded once the contribution area has been defined. Electronic devices that are outside of the defined contribution area may then be prevented from generating and/or providing contributing data records for inclusion in the combined data record.

Similarly, the contribution area, once defined, may subsequently be redefined. In these embodiments, any contributing data records provided by electronic devices that are were inside the original contribution area but are now outside of the redefined contribution area may be discarded. Alternatively, any contributing data records provided by electronic devices that are were inside the original contribution area but are now outside of the redefined contribution area may be retained (subject to any other tests or filters that might be applied to the contributing data records).

The contribution area may be redefined, for example, when the true geographical location of a particular event becomes known, or when the geographical locations of any of the electronic devices change, or when a larger or small contribution area is needed to collect relevant data records more effectively. As will be appreciated, the contribution area may, therefore, remain geographically fixed or may change (increase or decrease in size or move) over time.

An electronic device which was previously within a contribution area for a combined data record, and which had therefore previously been able to generate and/or provide a contributing data record for inclusion in that combined data record, may still be able to provide relevant and accurate data records for that combined data record even if that electronic device subsequently moves outside of that contribution area.

Thus, in some embodiments, inclusion of a data record in the combined data record is based on an earlier geographical location of the electronic device that later provides that data record.

For example, in some embodiments, if an electronic device has previously provided a contributing data record which has been included in a given combined data record (e.g. based on an earlier geographical location of that electronic device being within a contribution area for that combined data record), that electronic device may still be allowed to generate and/or provide one or more further contributing data records for inclusion in that combined data record at a later time, regardless of the current geographical location of that electronic device (subject to any other tests or filters that might be applied to the contributing data record).

Similarly, in some embodiments, if an electronic device has previously been able to generate and/or provide a contributing data record for inclusion in a given combined data record (e.g. based on an earlier geographical location of that electronic device being within a contribution area for that combined data record) but that electronic device has not yet generated and/or provided a data record for inclusion in that combined data record, that electronic device may still be allowed to generate and/or provide one or more contributing data records for inclusion in that combined data record at a later time, regardless of the current geographical location of that electronic device (subject to any other tests or filters that might be applied to the contributing data record).

Similarly, in some embodiments, if an electronic device would have been able to generate and/or provide a contributing data record for inclusion in a given combined data record at an earlier time (e.g. based on an earlier geographical location of that electronic device) but that combined data record had not yet been created and/or the contribution area for that combined data record had not yet been defined, that electronic device may still be allowed to generate and/or provide one or more contributing data records for inclusion in that combined data record once the combined data record has been created and/or once the contribution area for that combined data record has been defined, regardless of the current geographical location of that electronic device (subject to any other tests or filters that might be applied to the contributing data record).

Data records for a given combined data record (and contribution area) are preferably collected and combined so as to provide the combined data record for a limited period of time. The limited period of time could be, for example, a period of time less than 1 year, less than 1 month, less than 72 hours, less than 48 hours, or less than 24 hours. The limited period of time may be set by the system moderator or may be set by a user of an electronic device (e.g. the initiating electronic device), for example via a user interface of that device.

In embodiments in which the inclusion of a data record in a given combined data record is based on an earlier geographical location of the electronic device that provided that data record, the relevant earlier geographical locations to be considered are preferably the geographical locations of the electronic device during the limited period of time.

Preferably, after the limited period of time, no further contributing data records are included in (e.g. added to) the combined data record. This may be achieved by discarding data records for the combined data record which are provided after the limited period of time and/or by preventing electronic devices from generating and/or providing data records for the combined data record after the limited period of time.

Alternatively, data records for a given combined data record (and contribution area) may be collected and combined so as to provide the combined data record indefinitely.

The decision to include a data record in the combined data records may also or instead be based on whether or not the geographical location of the electronic device that provided the data record is outside of a particular defined geographical area (which area can be thought of as being an "exclusion area"). For example, in the event that data records from a particular area are considered not to be of interest or are considered not to be reliable, then those data records can be excluded from the combined data record.

Thus, in some embodiments, a data record is included in the combined data record if (and only if) the geographical location of the electronic device that provided the contributing data record is determined to be outside of a defined exclusion area.

The exclusion area may be defined in any desired or suitable way, e.g. using any one of the techniques for defining the contribution area described above.

As will be appreciated, the exclusion area for a given combined data record preferably does not completely overlap or is not the same as the contribution area for the combined data record. As will also be appreciated, in some embodiments, the exclusion area comprises the geographical locations which do not form part of the contribution area.

Preferably, a limit or limits are placed on the number of different combined data records that can be initiated or generated in or for the same or similar area (which area may be the "contribution area" discussed above, but could be any other suitable area) and/or at the same time. Such limits may be referred to herein as "combined data record" limits.

A combined data record limit may apply to some or all electronic devices within a given area and/or for a given period of time (e.g., such that, when this limit is reached, no more combined data records can be initiated or generated from within or for that given area and/or during that given period of time).

Similarly, a specific combined data record limit may apply to a given electronic device (e.g., such that, when this specific limit is reached, no more combined data records can be initiated or generated by that given electronic device from within or for that given area and/or during that given period of time, but such that other electronic devices may still be able to initiate or generate one or more combined data records from within or for that given area and/or during that given period of time (subject to that other device's own specific combined data record limit or limits or any combined data record limit that applies to all electronic devices)).

These embodiments are advantageous in that fewer, more comprehensive combined data records for a given area and/or time period are created. Users are, therefore, more likely to contribute to existing combined data records rather than to start new combined data records.

Thus, in some embodiments, the number of defined contribution areas that overlap (geographically and/or temporally) is limited such that a contributing electronic device in a given geographical location and/or at a given time may only be able to contribute to a limited number of combined data records.

The limit on the number of overlapping contribution areas at any one geographical location and/or time may be any number less than 200 contribution areas, more preferably any number less than 100 contribution areas, even more preferably any number less than 50 contribution areas, even more preferably any number less than 10 contribution areas, and most preferably any number less than 5 contribution areas.

In some embodiments, defined contribution areas are not permitted to overlap (geographically and/or temporally) at all such that an electronic device in a given geographical location and/or at a given time may only contribute to one combined data record.

Preferably, the limit or restriction on the number of overlapping contribution areas relates to the number of contribution areas that are defined (created) during a predetermined period of time. The period of time is preferably less than 72 hours, more preferably less than 48 hours, and most preferably less than 24 hours.

Similarly, the number of initial data records for combining with subsequent contributing data records within a given area may be limited (which area can be thought of as being a "restriction area"). The restriction area may be defined in any desired or suitable way, e.g. using any one of the techniques for defining the contribution area described above.

The limit on the number of initial data records within the restriction area may be any number less than 200 initial data records, more preferably any number less than 100 initial data records, even more preferably any number less than 50 initial data records, even more preferably any number less than 10 initial data records, and most preferably any number less than 5 initial data records.

In some embodiments, the limit on the number of initial data records may be 1, such that the electronic devices within the restriction area may only initiate one combined data record.

Preferably, the limit on the number of initial data records for the restriction area relates to the number of initial data records provided during a predetermined period of time. The period of time is preferably less than 72 hours, more preferably less than 48 hours, and most preferably less than 24 hours.

As will be appreciated, the restriction area may be the contribution area discussed above. Alternatively, the restriction area may be a different area to the contributing area, and may therefore be smaller or larger in area than the contributing area. In some embodiments, the restriction area has a radius that is larger or smaller than the radius of the contribution area by a selected, preferably predetermined, distance.

The predetermined distance may be a distance value less than 5 km, more preferably a distance value less than 2 km, and most preferably a distance value less than 1 km.

Alternatively, the selected distance may be a percentage of the radius of the contribution area. The percentage may be a percentage value less than 20%, more preferably may be a percentage value less than 10%, and most preferably may be a percentage value less than 5%.

Similarly, the number of initial data records that are provided by a given electronic device (e.g. while that device is within a restriction area and/or during a predetermined period of time) for combining with subsequent contributing data records may be limited.

The limit on the number of initial data records may be any number less than 200 initial data records, more preferably any number less than 100 initial data records, even more preferably any number less than 50 initial data records, more preferably any number less than 10 initial data records, and most preferably any number less than 5 initial data records. In some embodiments, the limit on the number of initial data records may be 1, such that an electronic device may only initiate one combined data record.

Preferably, the limit on the number of initial data records for a given device relates to the number of initial data records provided during a pre-set period of time. The period of time is preferably less than 72 hours, more preferably less than 48 hours, and most preferably less than 24 hours.

Preferably, the limit on the number of initial data records for a given device applies (and only applies) if that device is within a given geographical area (which area can be thought of as being a "restriction area" (as discussed above) that is particular to that given device).

Preferably, electronic devices of the system and/or the users of the electronic devices are informed if any of the limits or restrictions described herein have been reached. The users may be informed by any desired or suitable means of notification, for example by the electronic device providing an indication via its display screen (e.g. displaying a message or icon on the display screen and/or changing the appearance (e.g. transparency, colour or shape) of an icon on the display screen) or producing an audible tone.

Preferably, the electronic devices of the system are prevented from generating and/or providing further (initial) data records once the limits or restrictions described herein have been reached.

However, in some embodiments, the system or initiating electronic device may convert any data records intended to be initiating data records, but in excess of a limit or restriction, into contributing data records as appropriate for combining with an existing combined data record. This conversion and combination may, for example, be based on: the geographical location of the electronic device that provides the data record and the contribution area of the existing combined data record; and/or the contents of the data record and the contents of the existing combined data record.

As discussed above, the above embodiments can be used to restrict the number of different combined data records that can be generated in the same or similar area at the same time (e.g. for the same subject or event). This encourages users to contribute to existing combined data records so as to create fewer, more comprehensive combined data records for a subject or an event. Indeed, the Applicant believes that these arrangements are advantageous in their own right.

Thus, according to another aspect of the present invention there is provided a method of operating a system in which combined data records can each be generated by combining contributing data records from contributing electronic devices with an initial data record from an initiating electronic device, the method comprising:

once a first initial data record is received from an initiating electronic device, limiting the number of combined data records that can be generated from subsequent initial data records, the limiting being based on the geographical location of the electronic device that provides the subsequent initial data record and/or the geographical location of the electronic device that provides the first initial data record.

According to another aspect of the present invention there is provided an apparatus for use in a system in which combined data records can each be generated by combining contributing data records from contributing electronic devices with an initial data record from an initiating electronic device, the apparatus comprising:

means for, once a first initial data record is received from an initiating electronic device, limiting the number of combined data records that can be generated from subsequent initial data records, the limiting being based on the geographical location of the electronic device that provides the subsequent initial data record and/or the geographical location of the electronic device that provides the first initial data record.

According to another aspect of the present invention there is provided a system in which combined data records can each be generated by combining contributing data records from contributing electronic devices with an initial data record from an initiating electronic device, the system comprising:

one or more electronic devices; and means for, once a first initial data record is received from an initiating electronic device, limiting the number of combined data records that can be generated from subsequent initial data records, the limiting being based on the geographical location of the electronic device that provides the subsequent initial data record and/or the geographical location of the electronic device that provides the first initial data record.

As will be appreciated, the above aspects and embodiments of the present invention can comprise and preferably do comprise any or all of the preferred or optional features of the present invention described herein as appropriate.

Preferably, the electronic devices and/or the users of the electronic devices are made aware that they qualify to provide initial data records and/or contributing data records that can be combined with an initial data records.

Thus, preferred embodiments of the present invention comprise means for or steps of determining that an electronic device is within the contribution area and/or exclusion area and/or restriction area. Similarly, preferred embodiments of the present invention comprise means for or steps of indicating to an electronic device that it is determined to be within the contribution area and/or exclusion area and/or restriction area.

Preferably, the electronic devices are configured to inform their users that they qualify to provide initial data records and/or contributing data records by any desired or suitable means of notification, for example by the electronic device providing an indication via its display screen (e.g. displaying a message or icon on the display screen and/or changing the appearance (e.g. transparency, colour or shape) of an icon on the display screen) or producing an audible tone.

Preferably, the present invention comprises steps of or means for providing an indicator with each data record for indicating whether the data record is intended to be an initial data record or a contributing data record. For example, where a user has selected a published or displayed combined data record to contribute to, the data record provided by the user is preferably accompanied by an indication that the data record is a contributing data record rather than an initial data record. Similarly, where a user has selected to start a new combined data record for others to contribute to, the data record provided by the user is preferably accompanied by an indication that the data record is an initial data record rather than a contributing data record.

Embodiments of the invention may comprise limiting the number of contributing data records that can be provided by the electronic devices for combining with an initial data record. For example, only a predetermined number of contributing data records may be allowed. The predetermined number may be any number less than 1000, more preferably any number less than 500, and most preferably any number less than 100.

These embodiments may operate on a "first come first served basis" where only the first contributing data records provided are included in the combined data record.

Similarly, embodiments of the invention may also or instead comprise limiting the number of different contributing electronic devices that can provide contributing data records for combining with an initial data record. For example, only a predetermined number of contributing electronic devices may be able to provide contributing data records. The predetermined number may be any number less than 1000, more preferably any number less than 500, and most preferably any number less than 100.

These embodiments may also operate on a "first come first served basis" where only the first contributing electronic devices to provide contributing data records can have their contributing data records included in the combined data record.

Alternatively, the number of contributing data records that can be provided by the electronic devices for combining with an initial data record and/or the number of different contributing electronic devices that can provide contributing data records for combining with an initial data record may be unlimited.

As will be appreciated, it is possible that the initiating electronic device can itself become a contributing electronic device for an existing combined data record. Thus, embodiments of the invention can comprise the initiating electronic device providing a subsequent data record for combining with its (or another initiating electronic device's) initial data record as a contributing electronic device.

In embodiments in which the initiating electronic device provides a subsequent data record for combining with its own initial data record, that subsequent data record may be subject to any of the tests or filters for combining data records described herein as appropriate.

For example, the subsequent data record provided by the initiating electronic device may be subject to the geographical and/or proximity tests applied for other electronic devices discussed above, e.g. in the event that the initiating electronic device changes its geographical location subsequent to providing the initial data record.

Embodiments of the invention may also or instead comprise limiting the number of subsequent data records that can be provided by the initiating device for combining with the initial data record that it itself provided. The limit may be any number less than 1000, more preferably any number less than 500, and most preferably any number less than 100.

Embodiments of the invention may also or instead comprise limiting the period of time over which the initiating electronic device can provide subsequent data records for combining with the initial data record that it itself provided. The limited period of time may be, for example, the same time period as for any other electronic device that provides a contributing data record. The limited period of time could be, for example, a period of time less than 1 year, less than 1 month, less than 72 hours, less than 48 hours, or less than 24 hours. Preferably, after the limited period of time, no further subsequent data records from the initiating electronic device are included in the combined data record.

Alternatively, an initiating electronic device may be allowed to provide a subsequent data record for combining with the initial data record that it provided regardless of the geographical location of the initiating electronic device when it provides the subsequent data record and/or regardless of the number of contributing data records already provided and/or regardless of the time that the subsequent data record is provided.

The above conditions for including data records in a combined data record (e.g. geographical position/proximity/time conditions) may each be seen as being "tests" or "filters" that may be applied to the data records and/or electronic devices that provide the data records. In some embodiments, one or more of these tests or filters are the only tests or filters which are applied.

However, in other embodiments, additional tests or filters for including the data record in a combined data record may (subsequently) be applied. Embodiments of the present invention may, therefore comprise steps of or means for including contributing data records in a combined data record based on other additional tests or filters (i.e. other than geographical position/proximity/time tests). Such additional tests or filters can take any desired or suitable form.

For example, including contributing data records in the combined data record may additionally be based on a comparison between the content of the contributing data record and the initial data record and/or be based on a comparison between the content of the contributing data record and other contributing data records that are already in the combined data record.

Including contributing data records in the combined data record may also or instead be based on image or video orientation data that is provided with the data record. The orientation data preferably indicates the compass direction in which a camera of the electronic device was pointing when the image or video was taken by that camera.

For example, a data record having orientation data may be included in a combined data record if (and only if) the compass direction that is indicated by the orientation data is substantially the same as the compass direction that is indicated by orientation data associated with one or more other data records already provided (e.g. the initial data record). In embodiments, the respective compass directions may be considered as being substantially the same as each other if they are within 90°, more preferably 45°, more preferably 25°, and most preferably 10° of each other.

The inclusion of the contributing data record in the combined data record may also or instead be based on the bearing from the electronic device that provides that data record to the geographical location of an event or another electronic device of the system (e.g. the initiating electronic device).

For example, a data record having orientation data may be included in a combined data record if (and only if) the compass direction that is indicated by the orientation data is substantially the same as the bearing from the electronic device that provided that data record to the geographical location of an event or another electronic device of the system (e.g. the initiating electronic device). In embodiments, the compass direction that is indicated by the orientation data may be considered as being substantially the same as the bearing if the compass direction is within 90°, more preferably 45°, more preferably 25°, and most preferably 10° of the bearing.

These embodiments are advantageous in that the images or videos of the data records that are combined so as to form the combined data record are more likely to be pointed towards (and therefore visually capture) the same electronic device or event, and thus those data records are more likely to be related in terms of content.

The orientation data for a data record can be determined in any desired and suitable way. Preferably, the orientation data is determined by the electronic device that provides the data record by means that cannot easily be falsified, such that the orientation data for the data record is more likely to be genuine. For example, the orientation data may be determined by means other than user input, e.g. by a compass, magnetometer or accelerometer, in the electronic device that took the image or video. The orientation data is preferably combined in or associated with the data record (image or video) within the electronic device.

In less preferred embodiments, the orientation data for a data record may be indicated, for example, by user input to the electronic device.

The bearing may also be determined in any desired and suitable way, e.g. from the respective geographical locations of the electronic devices or the respective geographical locations of the contributing electronic device and the event.

Including contributing data records in the combined data record may also or instead be based on the user of the electronic device being a subscriber to the system (as will be discussed below).

Including contributing data records in the combined data record may also or instead be based on the size of, or amount of data included in, the data record. For example, a data record may be included in a combined data record if (and only if) the size of, or amount of data included in, the data record (or a part thereof) is equal to or below a predetermined limit. These embodiments are particularly advantageous in that only more concise data records (or parts of data records) may be provided for or included in the combined data record. Furthermore, a reduced amount of data storage may be required for the combined data record.

Similarly, a data record may also or instead be included in a combined data record if (and only if) the size of, or amount of data included in, the data record (or a part thereof) is equal to or above a predetermined limit. These embodiments are particularly advantageous in that only more substantial data records (or parts of data records) may be provided for or included in the combined data record.

In some embodiments, the size of, or amount of data included in, the data record "as provided" or "as received" is compared to the predetermined limit(s). However, in some embodiments, the data record as provided or received may be truncated, sampled, summarised or compressed (e.g. by an electronic device (the initiating electronic device) or other means within the system) so as to have a size or contain an amount of data that is equal to or below a predetermined limit.

In some embodiments, the electronic device that provides the data record may prevent the user from providing or generating a data record (or part thereof) that has a size greater than, or that contains more data than, a predetermined limit. Similarly, the electronic device that provides the data record may prevent the user from providing or generating a data record (or part thereof) that has a size smaller than, or that contains less data than, a predetermined limit.

In a preferred embodiment, the limit(s) on the size of, or amount of data included in, a data record (or part thereof) applies only to the initial data record. These embodiments are particularly advantageous in that only more concise initial data records (or parts of data records) may be provided for or included in the combined data record, but more substantial subsequent contributing data records may still be provided for or included in the combined data record. (As will be discussed below, a plurality of combined data records may be displayed in a list, with (only) the initial data record for each combined data record being shown, and with contributing data records for the combined data record (only) being shown when an initial data record for the combined data record is selected by a user. It is preferable in these embodiments that the listed initial data records are concise, for example to allow more initial data records to be displayed for selection by the user.)

In other embodiments, limit(s) on the size of, or amount of data included in, a data record (or part thereof) also applies to subsequent contributing data records. In these other embodiments the limit(s) for the subsequent contributing data records may be the same as, or may be different to (preferably including a limit or limits greater than), the limit(s) applied to the initial data record.

In a preferred embodiment, the initial data record and/or contributing data records (or parts of those data records) are limited to a predetermined number of text characters or fewer. The predetermined number of text characters is preferably a number of text characters that is less than or equal to 140 text characters and/or is preferably a number of text characters that is less than or equal to 45 text characters.

In a preferred embodiment, a first part of a data record (e.g. preferably a title or "headline" for that data record) is limited to a predetermined number of text characters that is less than or equal to 45 text characters, and a second part of the data record (e.g. preferably the "body" of that data record) is limited to a predetermined number of text characters that is less than or equal to 140 text characters.

In preferred embodiments, the electronic device that is used to provide the data record comprises means for displaying the number of characters already used for that data record (or for part of that data record) and/or the number of characters remaining that can be used for that data record (or for part of that data record). These embodiments allow the user to see how many characters they have remaining for composing their data record.

In preferred embodiments, the electronic device that is used to provide the data record comprises means for preventing the user from generating or providing a data record (or part thereof) having a number of characters greater than a predetermined number (e.g. 140 text characters or 45 text characters). For example, the electronic device may prevent a user from providing (transmitting) a data record (or part thereof) having a number of text characters greater than a predetermined number and/or may prevent a user from inputting more than a predetermined number of text characters when generating a data record (or part thereof) with the device.

The combined data record is preferably published, e.g. on a website, and/or displayed, e.g. on the display screens of the electronic devices themselves.

The combined data record may be published widely (e.g. published freely on a web site of the World Wide Web) or may only be accessible to a limited number of users (e.g. subscribers and/or users having a geographical location within a given area such as a contribution area).

In one embodiment, for a given electronic device, access to a combined data record is allowed or denied based on the geographical location of the given electronic device. In a preferred embodiment, the data records that are included in the combined data record are provided only by electronic devices that have geographical locations within a contribution area. The combined data record is preferably published such that only electronic devices having geographical locations within the contribution area and/or within the contribution area plus a selected, preferably predetermined, distance of the contribution area can access and display the combined data record.

The selected distance may be a distance value less than 5 km, more preferably a distance value less than 2 km, and most preferably a distance value less than 1 km.

Alternatively, the selected distance may be a percentage of the radius of the contribution area. The percentage may be a percentage value less than 20%, more preferably may be a percentage value less than 10%, and most preferably may be a percentage value less than 5%.

An advantage of the above arrangements is that only the electronic devices that are within or near to the contribution area (i.e. the electronic devices that are more likely to be interested in the combined data record that is associated with the contribution area) can view the combined data record that is associated with the contribution area. The users of the electronic devices that are near to (but not within) the contribution area may, having viewed the combined data record, decide to move into the contribution area so as to be able to provide a contributing data record.

However, in a less preferred embodiment, for a given electronic device, access to a combined data record is allowed or denied regardless of the geographical location of the given electronic device. In one embodiment, the combined data record is published such that electronic devices having geographical locations within the contribution area and electronic devices having geographical locations outside the contribution area can access and display the combined data record (such that the users of the electronic devices can view the combined data record regardless of geographical location).

Preferably, the electronic devices of the system and/or their users are made aware that there is an initial data record or combined data record to which contributions may be made. This may be achieved, for example, simply by publishing the initial data record and/or combined data record. In a preferred embodiment, however, this is also or instead achieved by sending invitations to the users of the electronic devices of the system to indicate that there is an initial data record or combined data record to which contributions may be made. The users may be informed that they have been invited to make contributions by any desired or suitable means of notification, for example by the electronic device providing an indication via its display screen (e.g. displaying a message or icon on the display screen and/or changing the appearance (e.g. transparency, colour or shape) of an icon on the display screen) or producing an audible tone.

In a preferred embodiment, such invitations are only sent to electronic devices having geographical locations within the contribution area. However, such invitations may also be sent to electronic devices that are outside the contribution area (e.g. regardless of the geographical locations of the electronic devices).

(As will be appreciated, the term "to publish" and its derivates used herein means to make available to or accessible by two or more of the electronic devices of the system, such that those electronic devices can display that which has been "published".)

In a preferred embodiment, the various data records are displayed in a list on the display screens of the electronic devices and/or are published in a list on a website. The data records may be displayed in a collapsed or truncated format if unselected by a user (e.g. only part of each data record for the combined data record is displayed) and then in an expanded or open format if selected or opened by the user (e.g. all of the data record is displayed).

The selection or opening of a given data record may indicate an interest in that data record. Accordingly, the selection or opening of a given data record may contribute to a rating associated with that data record (e.g. the number of times a given data record is selected or opened may be counted and used as the rating for that data record).

Embodiments of the present invention may comprise steps of or means for ordering and/or publishing the contributing data records for a given combined data record based on the number of accesses made to the contributing data records by electronic devices. For example, the data records having the largest number of views may be published and/or displayed at the top of a list of the data records in the combined data record. Data records having fewer views may be published and/or displayed at the bottom of the list, deleted from the combined data record or not published or displayed.

Embodiments of the present invention may comprise steps of or means for ordering and/or publishing the contributing data records for a given combined data record based on a rating associated with each of the contributing data records. For example, the data records having the highest rating may be published and/or displayed towards the top of a list of the data records in the combined data record. Data records having lower ratings may be published and/or displayed towards the bottom of the list, deleted from the combined data record or not published or displayed. The rating may be provided by users of electronic devices in the system or by a system moderator.

Embodiments of the present invention may comprise steps of or means for ordering and/or publishing the contributing data records for a given combined data record based on the order in which the data records are provided or received, e.g. by the electronic devices and/or from the electronic devices. For example, the data records that are provided or received first may be published and/or displayed towards the top of a list of the data records in the combined data record. Data records that are provided or received last may be published or displayed towards the bottom of the list or not published or displayed. Alternatively, the data records that are provided or received last may be published or displayed towards the top of a list of the data records in the combined data record. Data records that are provided or received first may be published and/or displayed towards the bottom of the list or not published or displayed.

Particularly preferred embodiments of the present invention comprise steps of or means for ordering and/or publishing the contributing data records for a given combined data record based on the geographical location of the electronic device that provided the data record. For example, data records that are sent by electronic devices that are closest to the geographical location of the initiating electronic device or a particular event, or closest to the centre of the contribution area, may be published and/or displayed towards the top of a list of the data records in the combined data record. Data records that are sent by electronic devices that are furthest from the geographical location of the initiating electronic device or a particular event, or furthest from the centre of the contribution area, may be published and/or displayed towards the bottom of the list or not published or displayed.

In other particularly preferred embodiments, the present invention comprises, for a given electronic device, steps of or means for ordering or allowing access to the data records of a given combined data record based on the geographical location of the given electronic device. For example, data records that are sent by other electronic devices that are closest to the geographical location of the given electronic device may be displayed towards the top of a list of the data records in the combined data record that is being accessed and displayed by the given electronic device. Data records that are sent by other electronic devices that are furthest from the geographical location of the given electronic device may be displayed towards the bottom of the list or not displayed.

An advantage of the above arrangement is that data records that are provided by other electronic devices that are nearer to the given electronic device (i.e. data records that are more likely to be of interest to the given electronic device) are preferably and more prominently displayed by the given electronic device.

The various ways of ordering the data records described herein may be combined and applied in any desired or suitable way. For example, data records in the combined data record may be ordered first by rating and then by geographical location, or first by number of accesses and then by time received etc.

A preferred embodiment comprises generating and/or publishing and/or displaying a plurality of combined data records in accordance with the present invention. In some embodiments, only a subset of the combined data records are published and/or displayed.

In a preferred embodiment, the various combined data records are displayed in a list on the display screens of the electronic devices and/or are published in a list on a website. The combined data records may be displayed in a collapsed or truncated format (e.g. on a ("front page") if unselected by a user (e.g. only the title or the initial data record for the combined data record is displayed) and then in an expanded format, or in an open format (e.g. on a "back page") if selected or opened by the user (e.g. more data records for the combined data record are displayed).

The selection or opening of a given combined data record may indicate an interest in that combined data record. Accordingly, the selection or opening of a given combined data record may contribute to a rating associated with that combined data record (e.g. the number of times a given combined data record is selected or opened may be counted and used as the rating for that combined data record).

Combined data records having higher ratings (that are determined as discussed above or otherwise, e.g. by user input) may be published and/or displayed and combined data records having lower ratings may not be published and/or displayed. The ratings may be provided by users of electronic devices in the system (either directly, e.g. by user input, or indirectly, e.g. by counting the number of times the combined data record is selected or opened) or by a system moderator.

In particularly preferred embodiments, the present invention comprises, for a given electronic device, steps of or means for ordering or allowing access to the combined data records based on the geographical location of the given electronic device and/or the geographical locations associated with each of the combined data records. For example, a combined data record that has a geographical location of an event and/or an initiating electronic device associated with it that is closest to the geographical location of the given electronic device may be displayed towards the top of a list of combined data records that are being accessed and displayed by the given electronic device. Combined data records that have geographical locations of events and/or initiating electronic devices associated with them that are further from the geographical location of the given electronic device may be displayed towards the bottom of the list or not displayed. In particularly preferred embodiments, the order of the combined data records on the display screen of the given electronic device is based only on the geographical location of that given electronic device and the respective geographical locations associated with each of the combined data records (e.g. is based only on the proximity of the event location and/or initiating electronic device for each of the combined data records to that given electronic device).

An advantage of the above arrangements is that combined data records that are associated with geographical locations that are nearer to the given electronic device (combined data records that are more likely to be of interest to the given electronic device) are preferably and more prominently displayed by the given electronic device.

As discussed above, the ability to provide initial or contributing data records, and/or the ability to access or display the published combined data record may be limited to subscribers of the system or limited to devices "known" to each other. The users of the electronic devices may be identified by way of a unique username and/or the electronic devices themselves may be associated with a unique identifier.

The subscribers are preferably required to "login" so as to become part of the system (e.g. by way of a username and/or password) before they can provide initial or contributing data records and/or view the published combined data record.

An electronic device or its user may be temporarily or permanently excluded from providing initial or contributing data records e.g. if the rating associated with a number of the electronic device's or user's initial or contributing data records is below a predetermined level.

The data records themselves may comprise, e.g., text and/or pictures and/or video and/or audio, as desired. The data records may be provided via a software application of the electronic devices (e.g. that includes a text editor and/or can use the camera/microphone of the electronic devices). Similarly, the data records may be viewed via a or the software application (e.g. that includes a document viewer and/or media player).

Preferably, the electronic devices are substantially portable communication devices such as laptops, PDAs, tablets, mobile phones (e.g. "smart-phones"), portable games consoles, etc. The electronic devices may, however, be substantially non-portable communication devices such as personal desktop computers, internet enabled televisions, internet enabled optical (e.g. DVD) or hard disk players, games consoles etc.

In one embodiment, the apparatus that manages the process of generating combined data records (having the various "means" for performing the steps of the present invention) is one of the electronic devices of the system (e.g. the initiating electronic device). Thus, embodiments may comprise one of the electronic devices of the system (e.g. the initiating electronic device) receiving data records (e.g. one or more contributing data records) and combining those data records (e.g. with the initial data record).

Alternatively, the apparatus that manages the process of generating combined data records (having the various "means" for performing the steps of the present invention) is a server of the system (e.g. a computer). Thus, embodiments may comprise a server receiving the data records that are provided by the electronic devices (e.g. the initial data record and one or more contributing data records) and combining those data records.

Equally, the apparatus that manages the process of generating combined data records may be distributed across the overall system, e.g. in part be in one or more of the electronic devices of the system (e.g. the initiating electronic device) and in part in a server of the system. Thus, the various "means" for performing the steps of the present invention may be distributed between one or more of the electronic devices and the server of the system as desired.

Accordingly, either a server and/or an electronic device (e.g. the initiating electronic device) may receive data records. Similarly, the server and/or the electronic device may be responsible for any of the other actions detailed above, e.g. selecting which data records to include in the combined data record and/or preventing an electronic device from generating and/or providing a data record for a given combined data record, defining the contribution/exclusion/restriction area(s), publishing or displaying the combined data record, defining and enforcing any tests or limits, ordering data records, providing indicators about the data records (indicating that a data record is contributing or initial), informing electronic devices that they can/cannot provide qualifying data records etc.

In a preferred embodiment, the relationship between the electronic devices and the server is a client-server relationship. The electronic devices preferably comprise client software (e.g. an downloadable software application or "app") and/or hardware for managing and/or carrying out any or all of the steps of embodiments of the present invention as desired. The server preferably comprises complementary server software and/or hardware for managing and/or carrying out any or all of the steps of embodiments of the present invention as desired.

The data records can be transmitted and/or received in any desired or suitable way within the system and/or between the electronic devices e.g. either wired (e.g. via Ethernet cables, fibre optic cables etc.) or wirelessly (e.g. via a mobile communications network, WiFi, Bluetooth etc.).

In a preferred embodiment, communication between the electronic devices and/or the server (e.g. the transmitting/receiving of data records and/or combined data records and/or notifications) takes places over a wired and/or wireless network. Preferably the wireless network is, at least in part, a mobile communications network. Preferably the wired network is, at least in part, the internet.

Thus, it will be appreciated from the above that the present invention may be embodied by a system comprising a server, an initiating electronic device and one or more contributing electronic devices. The initiating device may send an initial data record to the server, the server may then determine the geographical location of the initiating device and establish a contribution area from within which other electronic devices can send data records to be combined with the initial data record. The server may indicate to other electronic devices that the initial data record has been received. The combined data record may be published such that electronic devices (e.g. either based on their geographical locations or irrespective of their geographical locations) can display the combined data record.

Thus, according to another aspect of the invention there is provided a method for generating a combined data record for publication using a server, comprising the server:

receiving an initial data record provided by an initiating electronic device;
determining the geographical location of the initiating electronic device;
establishing a contribution area containing the geographical location of the initiating electronic device;
receiving one or more contributing data records provided respectively by one or more contributing electronic devices;
determining the geographical locations of each of the one or more contributing electronic devices;
discarding contributing data records that are received from contributing electronic devices that are outside of the contribution area;
combining one or more contributing data records that are received from contributing electronic devices that are within the contribution area with the initial data record to form a combined data record; and
allowing two or more electronic devices to access the combined data record.

According to another aspect of the invention there is provided a server for generating a combined data record for publication, the server comprising:

means for receiving an initial data record provided by an initiating electronic device;
means for determining the geographical location of the initiating electronic device;
means for establishing a contribution area containing the geographical location of the initiating electronic device;
means for receiving one or more contributing data records provided respectively by one or more contributing electronic devices;
means for determining the geographical locations of each of the one or more contributing electronic devices;
means for discarding contributing data records that are received from contributing electronic devices that are outside of the contribution area;
means for combining one or more contributing data records that are received from contributing electronic devices that are within the contribution area with the initial data record to form a combined data record; and
means for allowing two or more electronic devices to access the combined data record.

According to another aspect of the invention there is provided a method for generating a combined data record for publication using a server, comprising the server:

determining the geographical location of an initiating electronic device;

allowing the initiating electronic device to generate and/or provide an initial data record, the allowing optionally being based on the geographical location of that initiating electronic device;

establishing a contribution area containing the geographical location of the initiating electronic device;

determining the geographical locations of a plurality of electronic devices;

allowing one or more electronic devices which are determined to be within the contribution area to generate and/or provide a contributing data record;

preventing one or more electronic devices which are determined to be outside of the contribution area from generating and/or providing a contributing data record;

combining one or more of the contributing data records that are received from the one or more electronic devices that are determined to be within the contribution area with the initial data record to form a combined data record; and allowing the electronic devices to access the combined data record.

According to another aspect of the invention there is provided a server for generating a combined data record for publication, the server comprising:

means for determining the geographical location of an initiating electronic device;

means for allowing the initiating electronic device to generate and/or provide an initial data record, the allowing optionally being based on the geographical location of that initiating electronic device;

means for establishing a contribution area containing the geographical location of the initiating electronic device;

means for determining the geographical locations of a plurality of electronic devices;

means for allowing one or more electronic devices which are determined to be within the contribution area to generate and/or provide a contributing data record;

means for preventing one or more electronic devices which are determined to be outside of the contribution area from generating and/or providing a contributing data record;

means for combining one or more of the contributing data records that are received from the one or more electronic devices that are determined to be within the contribution area with the initial data record to form a combined data record; and means for allowing the electronic devices to access the combined data record.

As will be appreciated, these aspects of the present invention can comprise and preferably do comprise any or all of the preferred and optional features of the present invention described herein as appropriate.

It will also be appreciated from the above that the present invention may be embodied by an electronic device of a system that comprises the electronic device and one or more contributing electronic devices. The electronic device may determine its own geographical location and establish a contribution area from within which other electronic devices can send data records to be combined to form a combined data record. The combined data record may be published such that only the electronic device can display the combined data record or may be published such that other electronic devices (e.g. based on or irrespective of their geographical locations) can display the combined data record. The electronic device may invite the other electronic devices to contribute data records.

Thus, according to another aspect of the invention there is provided a method for generating a combined data record for publication or display using an electronic device, comprising the electronic device:

determining the geographical location of the electronic device;

establishing a contribution area containing the geographical location of the electronic device;

receiving one or more contributing data records provided respectively by one or more contributing electronic devices;

determining the geographical locations of each of the one or more contributing electronic devices;

discarding contributing data records that are received from contributing electronic devices that are outside of the contribution area;

combining two or more contributing data records that are received from contributing electronic devices that are within the contribution area to form a combined data record; and allowing two or more electronic devices to access the combined data record and/or displaying the combined data record on the electronic device.

According to another aspect of the invention there is provided an electronic device for generating a combined data record for publication or display, the electronic device comprising:

means for determining the geographical location of the electronic device;

means for establishing a contribution area containing the geographical location of the electronic device;

means for receiving one or more contributing data records provided respectively by one or more contributing electronic devices;

means for determining the geographical locations of each of the one or more contributing electronic devices;

means for discarding contributing data records that are received from contributing electronic devices that are outside of the contribution area;

means for combining two or more contributing data records that are received from contributing electronic devices that are within the contribution area to form a combined data record; and means for allowing two or more electronic devices to access the combined data record and/or displaying the combined data record on the electronic device.

As will be appreciated, these aspects of the present invention can comprise and preferably do comprise any or all of the preferred and optional features of the present invention described herein, as appropriate.

The present invention also extends to data structures obtained during or as a result of the methods described herein.

Thus, according to another aspect of the present invention there is provided a data structure comprising:

one or more contribution area co-ordinate fields each containing co-ordinate data that can be used to define a contribution area; and an initial data record field comprising text, image, audio and/or video data.

Preferably, the data structure further comprises an initial time field, the initial time field comprising time and/or date data associated with the initial data record field.

Preferably, the data structure further comprises an initiating device identity field, the initiating device identity field comprising a device identifier associated with the initial data record field.

Preferably, the data structure further comprises one or more contributing data record fields each comprising text, image audio and/or video data.

Preferably, the data structure further comprises one or more contributing time fields respectively comprising time and/or date data associated with the one or more contributing data record fields.

Preferably, the data structure further comprises one or more contributing device identity fields respectively comprising a contributing device identifier associated with the one or more contributing data record fields.

Preferably, the data structure further comprises one or more contributing co-ordinate fields respectively comprising co-ordinate data associated with the one or more contributing data record fields. In some embodiments, the one or more contributing co-ordinate fields are the one or more contribution area co-ordinate fields.

Preferably, the data structure comprises an initial co-ordinate field comprising co-ordinate data associated with the initial data record field. In some embodiments, the initial co-ordinate field is one of the one or more contribution area co-ordinate fields.

The data structure may comprise a radius field, the radius field containing distance data that, together with a co-ordinate from the one or more contribution area co-ordinate fields, can be used to define the contribution area. Alternatively, the data structure may comprise three or more contribution area co-ordinate fields containing co-ordinate data that can be used to define the contribution area.

The functions of the present invention can be implemented in hardware or software, as desired. Thus, for example, the various "means" of the invention may comprise suitable data processing means (e.g. of a processor or processors) for performing those functions, such as appropriately dedicated hardware elements and/or programmable hardware elements that can be programmed to operate in the desired manner.

In one embodiment the system is implemented as a hardware element (e.g. ASIC). Thus, in another aspect the present invention comprises a hardware element including the apparatus of, or operated in accordance with the method of, any one or more of the aspects or embodiments of the invention described herein.

It should also be noted here that, as will be appreciated by those skilled in the art, the various functions, etc., of the present invention may be duplicated and/or carried out in parallel on a given processor.

It will also be appreciated by those skilled in the art that all of the described aspects and embodiments of the present invention can include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out any of the methods herein described when run on data processing means of an electronic device or server, a computer program element comprising computer software code portions for performing any of the methods herein described when the program element is run on data processing means of an electronic device or server, and a computer program comprising code means adapted to perform the steps of any of the methods herein described when the program is run on a data processing means of an electronic device or server. The data processing system may be a microprocessor system, a programmable FPGA (Field Programmable Gate Array), etc.

The invention also extends to a computer software carrier comprising such software which when used to operate a processor, electronic device or system comprising data processing means causes in conjunction with said data processing means said processor, electronic device or system to carry out the steps of any of the methods described herein.

Such a computer software carrier could be a physical (non-transitory) storage medium such as a ROM chip, CD ROM or disk, or could be a transitory medium or signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with an electronic device or system. Such an implementation may comprise a series of computer readable instructions either fixed on a tangible medium, such as a computer readable medium, for example, diskette, CD ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a or the server or electronic bulletin board over a network, for example, the Internet or World Wide Web.

The methods of the present invention are preferably implemented through a single software application ("app") or website. The advantage of such embodiments is that the user of the electronic device needs only to have one application or to use one website in order to provide data records for different combined data records. For example, when a user attends a first event (e.g. a football match) and then attends a second event (e.g. a motor race), the user does not need to have different applications or to know different websites that are particular to the first and second events in order to provide data records related to those different events. Similarly, the user of the electronic device needs only to have one application or to use one website in order to access different combined data records. For example, the user does not need to have different applications or to know the different websites particular to the first and second events in order to access the different combined data records for those different events.

Embodiments of the invention therefore allow for a "singular" approach to forming and accessing different combined data records. Furthermore, the singular approach would not overwhelm the user of the electronic device with a large number of different combined data records to contribute to or to access because, as discussed herein, the combined data records may be shown or displayed to the user based on the geographical location of the electronic device. Accordingly, only a reduced number of combined data records that are geographically more relevant to the electronic device that is contributing to or accessing the combined data records may be shown or displayed to the user.

Embodiments of the present invention will now be described, by way of example only, with reference to the accompanying figures in which:

FIG. 1 shows a communications system 112 according to an embodiment of the present invention.

Figure 1:
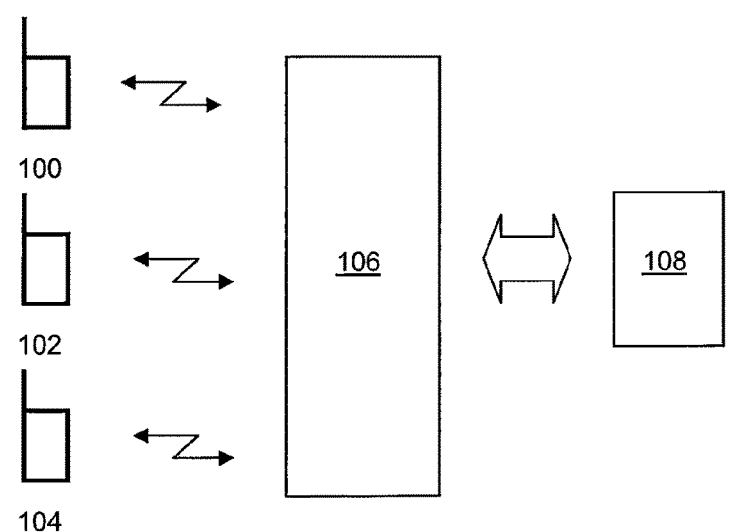
FIG. 1 shows a communications system that can be operated in accordance with an embodiment of the present invention.

The communications system 112 comprises electronic devices 100, 102, 104. In this embodiment the electronic devices 100, 102, 104 are all mobile phones (e.g. "smartphones"). However, in other embodiments the electronic devices 100, 102, 104 may comprise any combination of, for example, mobile phones, personal computers, laptops, PDAs etc, or any other electronic devices that are capable of transmitting and/or receiving data records such as text, images or videos. In some embodiments, the electronic devices may have cameras for capturing images and/or videos, and may have compasses, magnetometers and/or accelerometers for deriving orientation data (e.g. a compass direction) to be associated with each of those images or videos.

The communications system 112 also comprises a server 108 which, in some embodiments, manages the process of generating combined data records. In this embodiment, the server 108 is a computer. However, the server 108 could equally be any other electronic device that is capable of combining data records.

In some embodiments, the server 108 can be omitted. In such embodiments, as will be discussed below with reference to FIG. 4, one of the electronic devices 100, 102, 104 manages the process of generating combined data records.

The electronic devices 100, 102, 104 communicate with each other (and with the sever 112) via a network 106. The network 106 in this embodiment is a wireless mobile communication network. However, it is contemplated that the network may be any other kind of suitable network such as the internet, or a combination of suitable networks.

In some embodiments, communication can take place directly between the electronic devices (without communication via the network 106) using known wireless communication protocols such as Bluetooth.

Figure 2:
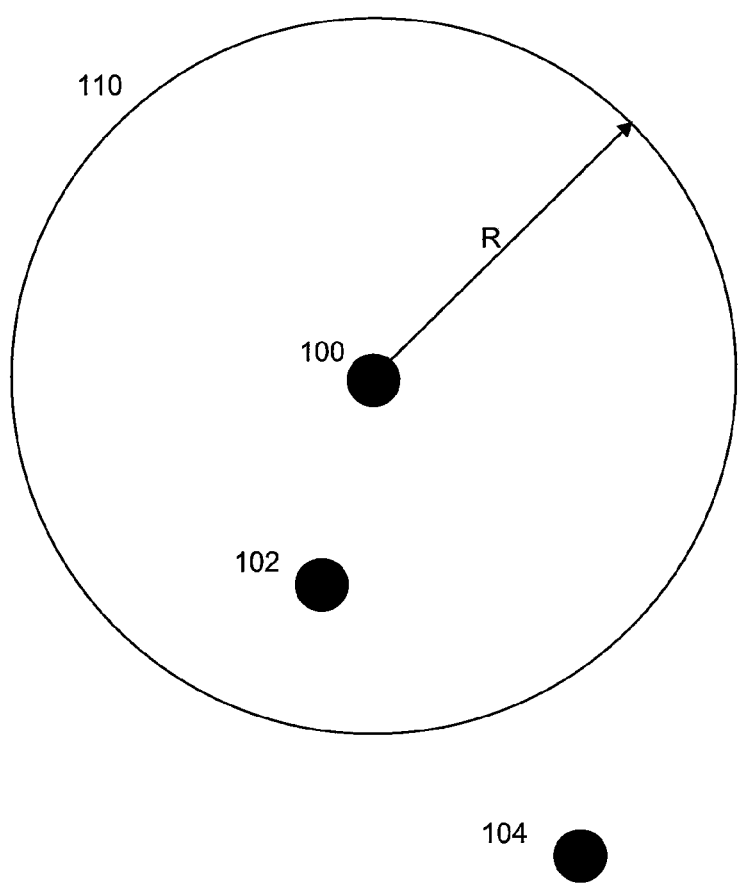
FIG. 2 shows the positions of the portable electronic devices of the system of FIG. 1.

FIG. 2 shows the geographical locations of the portable electronic devices 100, 102, 104 that form part of the communications system 112 of FIG. 1. In this embodiment, the electronic devices 100, 102, 104 are substantially portable, such that the geographical locations of each the electronic devices is likely to vary with time. However, in embodiments in which one or more of the electronic devices is, for example, a personal computer, the geographical location of that electronic device may remain substantially fixed.

In FIG. 2, a first electronic device 100 and a second electronic device 102 are shown as being located within a defined "contribution area" 110. A third electronic device 104 is shown as being located outside the contribution area 110. In this embodiment, the contribution area 110 is a defined as a circle centred on the first electronic device 100 and having a radius R. The location of the contribution area 110 in this embodiment is geographically fixed, and therefore does not move if the first electronic device 100 moves. However, embodiments are contemplated in which the contribution area 110 moves with the first electronic device 100.

Figure 3:
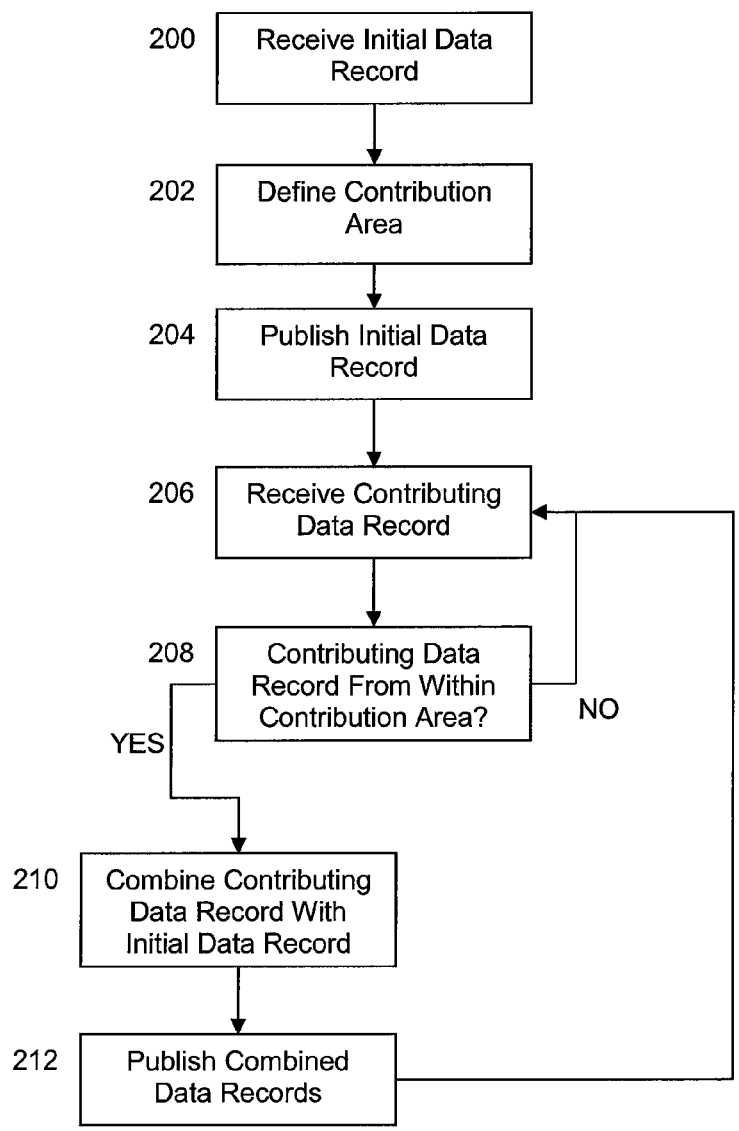
FIG. 3 is a flow chart that illustrates a method of using the system of FIG. 1 according to an embodiment of the present invention.

FIG. 3 illustrates a method of generating a combined data record using the system 112 described with reference to FIGS. 1 and 2.

The method begins at step 200. At that step, an initial data record is sent by the first electronic device 100 and is received by the server 108 of the communications system 112. In a preferred embodiment, a first "title" part of the initial data record is limited to 45 characters or fewer by the first electronic device 100 or by the server 108, and a second "body" part of the initial data record is limited to 140 characters or fewer by the first electronic device 100 or by the server 108. The server 108 stores the initial data record in memory.

The data record may comprise, for example, text, an image and/or a video of an event that has taken place within the vicinity of the first electronic device 100. The first electronic device 100 may also include with the data record an identifier that indicates that that data record is intended by the user of the first electronic device 100 to be an initial data record intended to start a new combined data record.

At step 202, the server 108 identifies the data record as being an initial data record. The server 108 then defines the area 110 that will serve as a contribution area for any subsequently received contributing data records.

In the present embodiment, the contribution area 110 is defined in and by the server 108 as a circle centred on the first electronic device 100 and having a radius R. In this embodiment, the radius R may be a predetermined distance of, for example, 1 km. However, in other embodiments, the radius R may be derived by the server 108 based on the distance between the first electronic device 100 and its nearest electronic device (in this embodiment, the second electronic device 102) plus a selected, preferably predetermined, additional distance.

In this embodiment, the server 108 sets the location of the first electronic device 100 as the centre of the circle. The location of the first electronic device 100 may be determined by the server 108 or may be determined by the first electronic device 100 and transmitted together with the initial data record.

At step 204, the server 108 makes the combined data record stored on the server 108 accessible to other electronic devices in the system 112 (i.e. the server publishes the initial data record). The initial data record can then be displayed on the display screens of the second electronic device 102 and the third electronic device 104, and viewed by the users of those devices.

In some embodiments, the server 108 indicates to the second electronic device 102 that it is considered to be within the contribution area 110 and/or may indicate to the third electronic device that it is considered not to be within the contribution area 110.

At step 206, the server 108 receives subsequent contributing data records from contributing electronic devices. The contributing data records may comprises, for example, a text comment, an image and/or a video of the event that is the subject of the initial data record. The contributing electronic devices may include with the data record an identifier that indicates that that data record is intended by the user to contribute to an existing data record.

At step 208, the server 108 determines whether or not the contributing data record was sent by an electronic device that is within the contribution area 110. This may be achieved by the server 108 determining the location of the electronic device or by the electronic device transmitting its GPS location together with its contributing data record.

If the electronic device is not within the contribution area 110, then the server 108 discards the data record sent by that electronic device and returns to step 206 to wait for or process a further contributing data record. Any contributing data records sent by the third electronic device 104, for example, will be discarded by the server 108. The server 108 may inform an electronic device if its contributing data record is discarded.

If the electronic device is within the contribution area 110, then the server 108 will proceed to step 210, in which the contributing data record is combined with the initial data record and is stored on the server 108 as a combined data record. In this embodiment, any contributing data records sent by the first electronic device 100 and/or second electronic device 102, for example, will be combined with the initial data record by the server 108.

However, in some embodiments, the server 108 may perform one or more additional tests on the data records provided by the first electronic device 100 and/or second electronic device 102 before combining those data records with the initial data record. For example, if a data record provided by the second electronic device 102 comprises an image or video having associated orientation data, the server 108 may additionally check that the orientation of that image or video is towards the location of the first electronic device 100 and/or is a similar orientation to one or more images or videos that are already in the initial data record.

The server 108 may inform an electronic device if its contributing data record is included in the combined data record.

At step 212, the server 108 makes the combined data record that is stored on the server 108 accessible to other electronic devices in the system 112 (i.e. the server publishes the combined data record) and returns to step 206 to wait for or process a further contributing data record. Steps 208 to 212 may then be repeated to build up a progressively larger combined data record for publication.

In this embodiment, the means for selectively including a data record provided by the contributing electronic devices in the combined data record is provided within the server. That means may, therefore, be a software application running on a processor of the server.

The embodiment of FIG. 3 has been described with a step (step 208) that includes the server 108 determining whether or not a received contributing data record was sent by an electronic device that is within the defined contribution area 110. However, in some embodiments, an electronic device that is outside the defined contribution area 110 could instead be prevented even from preparing and/or sending a contributing data record if that electronic device is determined to be outside the defined contribution area 110. Such prevention may be realised by a software application running on the electronic devices. In other words, the software on the electronic devices may only grant permission to create and/or send a contributing data record if the electronic device is within the defined contribution area 110. In these embodiments, all data records that are received by the server 108 can automatically be combined with the initial data record for publication.

Figure 4:
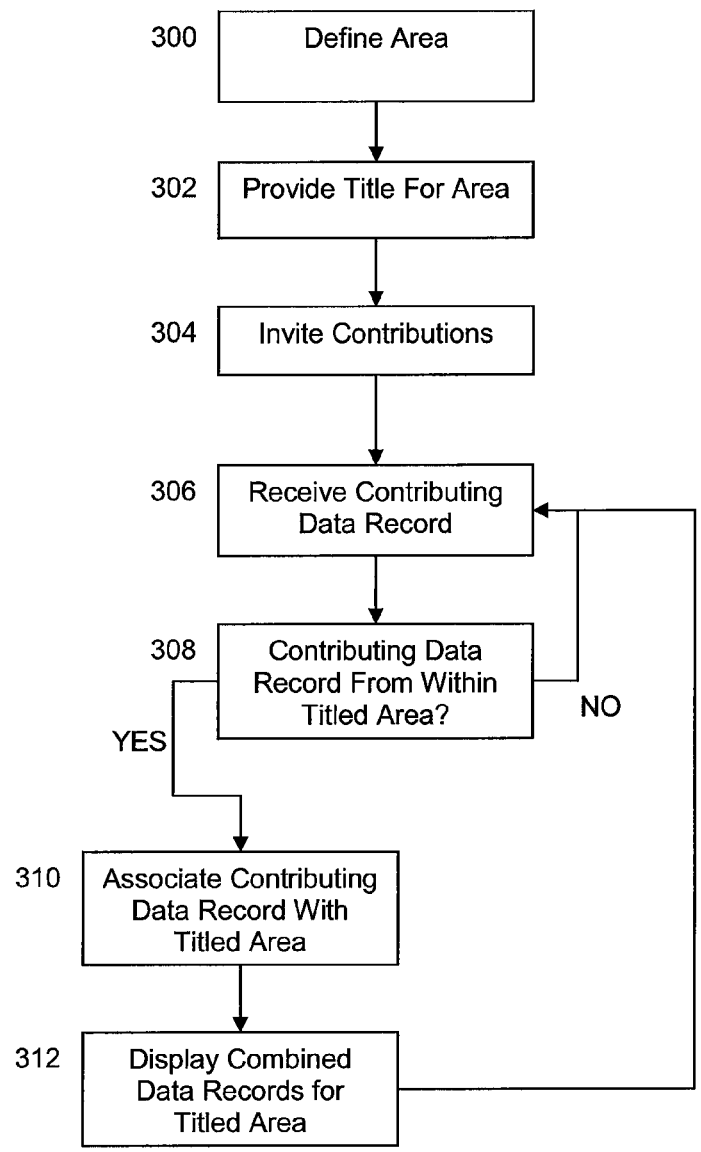
FIG. 4 is a flow chart that illustrates an alternative method of using the system of FIG. 1 according to an embodiment of the present invention.

FIG. 4 illustrates another method of generating a combined data record using the system 112 described with reference to FIGS. 1 and 2. In this embodiment, the server 108 may be omitted.

The method begins at step 300, in which the first electronic device 100 itself defines the contribution area 110 that will serve as a contribution area for any contributing data records. The area 110 in this embodiment is defined by the user of the first electronic device 110 as a circle centred on the first electronic device 100 having a radius R. The distance R may be selected by the user of the first electronic device 110 and the location of the first electronic device 100 may be determined by the first electronic device 100 itself using its own GPS device.

In other embodiments, the contribution area 110 may defined by being drawn on a digital map by the user of the first electronic device 100.

At step 302, the user of the first electronic device 100 provides a title (e.g. "My Contribution Area") for the contribution area 110. The contribution area 110 may also or instead be associated with some other text, an image and/or a video, for example, a photograph or video of an event that has taken place within the vicinity of the first electronic device 100. The title and/or other text/image/video associated with the contribution area 110 may be seen as being an initial data record. In a preferred embodiment, a first "title" part of the initial data record is limited to 45 characters or fewer by the first electronic device 100 and a second "body" part of the initial data record is limited to 140 characters or fewer by the first electronic device 100. The initial data record is stored on the first electronic device 100.

At step 304, the first electronic device 100 invites other electronic devices to send contributing data records. In some embodiments, the first electronic device 100 informs or indicates to other electronic devices (e.g. the second electronic device 102) that they are considered to be within the defined contribution area 110 and/or may indicate to other electronic devices (e.g. the third electronic device 104) that they are considered not to be within the defined contribution area 110.

At step 306, the first electronic device 100 receives a data record (contributing data record) from a contributing electronic device. The contributing data record may comprise, for example, a text comment, an image and/or video.

At step 308, the first electronic device 100 determines whether or not the contributing data record was sent by an electronic device that was within the defined contribution area 110. This may be achieved by the electronic device transmitting its GPS location together with its contributing data record.

If the electronic device is not within the contribution area 110, then the first electronic device 100 will discard the data record sent by that electronic device and return to step 306 to wait for or process a further contributing data record. Any contributing data records sent by the third electronic device 104, for example, will be discarded by the first electronic device 100. The first electronic device 100 may inform an electronic device if its contributing data record is discarded.

If the electronic device is within the defined contribution area 110, then the first electronic device will proceed to step 310, in which the contributing data record is associated with the titled area (i.e. combined with the initial data record) and stored in the first electronic device 100. In this embodiment, any contributing data records sent by the second electronic device 102, for example, will be associated with the titled area defined by the first electronic device 100.

However, in some embodiments, the first electronic device 100 may perform one or more additional tests on the data records provided by the second electronic device 102 before associating those data records with the titled area. For example, if a data record provided by the second electronic device 102 comprises an image or video having associated orientation data, then the first electronic device 100 may additionally check that the orientation of that image or video is towards the location of the first electronic device 100 and/or is a similar orientation to one or more images or videos that are already associated with the titled area.

The first electronic device 100 may inform an electronic device if its contributing data record is included in the combined data record.

At step 312, the first electronic device 100 displays the combined data record for the titled area on its own display screen. The first electronic device 100 may also or instead make the combined data record accessible to other electronic devices in the system 112 (i.e. publish the combined data record). The first electronic device 100 returns to step 306 to wait for or process a further contributing data record.

Steps 308 to 312 may be repeated to build up a progressively larger combined data record for display and/or publication.

In this embodiment, the means for selectively including a data record provided by the contributing electronic devices in the combined data record is provided as part of the first electronic device. The means may, therefore, be provided by a software application ("app") downloaded to and running on a processor of the electronic device.

The embodiment of FIG. 4 has been described with a step (step 308) that includes the first electronic device 100 determining whether or not a received contributing data record was sent by an electronic device that is within the defined contribution area 110. However, in some embodiments, an electronic device that is outside the defined contribution area 110 could be prevented from preparing and/or sending a contributing data record, or from knowing about the titled contribution area, if that electronic device is determined to be outside the defined contribution area 110. Such prevention may be realised by a software application running on the electronic device, which only grants permission to create and/or send a contributing data record, or permission to know about the titled area, to electronic devices that are within the defined contribution area 110. In these embodiments, all data records that are received by the first electronic device 100 can automatically be associated with the titled area and stored for display and/or publication.

The embodiments of FIGS. 3 and 4 have been described with the contributing area 110 being defined with reference to the first electronic device 100. However, it is contemplated that a contributing area could be defined so as not to be defined with reference to an electronic device. For example, the contributing area 110 could equally have been defined by the server 108, or the first electronic device 100, or the second electronic device 102, or indeed the third electronic device 104 based on an event due to take place at the location of the first electronic device 100.

It will be seen from the above that the present invention provides embodiments in which a number of data records for publication or display can be dealt with both quickly and accurately, and in which a reduced amount of data storage for data records is required. This is achieved, in the preferred embodiments at least, by selecting which data records to combine for publication and/or display based on the geographical location or proximity of electronic devices in the system.

The invention claimed is:

1. A method of generating one or more combined data records for publication or display in a system in which a plurality of electronic devices can each provide a data record, the method comprising:
   one of a server and an electronic device of the plurality of electronic devices performing the steps of:
   receiving initial data records from initiating electronic devices of the plurality of electronic devices;
   determining a geographical location of each of the initiating electronic devices;
   defining a contribution area for each initial data record based on at least one of:
   a) the geographical location of an event or the geographical location of a corresponding initiating electronic device; and
   b) the distance between the event or corresponding initiating electronic device and a contributing second electronic device;
   receiving contributing data records from contributing electronic devices of the plurality of electronic devices;
   determining the geographical location of each of the contributing electronic devices;
   forming plural combined data records for publication and display on electronic devices of the plurality of electronic devices, wherein each combined data record is formed by combining one or more of the contributing data records that are received from the contributing electronic devices with one of the initial data records received from the initiating electronic devices;
   wherein forming each of the plural combined data records comprises determining if the determined geographic location of a particular contributing electronic device is within the contribution area for a particular initial data record, and if so, including a contributing data record from that particular contributing electronic device in the combined data record for that particular initial data record;
   defining a geographical restriction area, and a combined data record limit for the geographical restriction area;
   limiting the number of different combined data records for publication and display that can be generated from initial data records in the defined geographical restriction area such that, when the combined data record limit is reached, electronic devices that have a geographical location within the restriction area cannot provide further initial data records to initiate further different combined data records for publication and display; and
   publishing the combined data records such that electronic devices of the plurality of electronic devices can access and display the combined data records.

2. A method as claimed in claim 1 comprising at least one of:
   selectively allowing an electronic device to perform at least one of generating or providing a data record for inclusion in the combined data record based on the geographical location of that electronic device; or
   selectively preventing an electronic device from at least one of generating or providing a data record for inclusion in the combined data record based on the geographical location of that electronic device.

3. A method as claimed in claim 1 wherein inclusion of a data record in the combined data record is based on at least one of:
the proximity of the electronic device that provided the data record to an event location; or
the data record being provided during a predefined period of time.

4. A method as claimed in claim 1 comprising:
for a given electronic device, allowing or denying access to the combined data record based on the geographical location of the given electronic device.

5. A method as claimed in claim 1 comprising one or more of:
at least one of ordering or publishing the data records for the combined data record based on the number of accesses made to each of the data records in the combined data record by electronic devices;
at least one of ordering or publishing the data records for the combined data record based on a rating associated with each of the data records in the combined data record;
at least one of ordering or publishing the data records for the combined data record based on the order in which each of the data records in the combined data record are provided or received;
at least one of ordering or publishing the data records for the combined data record based on the geographical location of the electronic device that provided each of the data records in the combined data record.

6. A method as claimed in claim 1 wherein:
the electronic devices are portable communication devices.

7. A method as claimed in claim 1 wherein:
the apparatus that manages the process of generating combined data records is at least one of an electronic device of the system or a server of the system.

8. A method as claimed in claim 1 comprising, for a given electronic device at least one of:
allowing or denying access to one or more of the combined data records based on the geographical location of the given electronic device; or
selecting an order of display of the combined data records for the given electronic device based on the geographical location of the given electronic device and/or the respective geographical locations associated with each of the combined data records.

9. A method as claimed in claim 1 wherein:
the selective inclusion of a data record in the combined data record is based on at least one of image or video orientation data that is associated with that data record.

10. An apparatus for generating a combined data record for publication or display in a system in which a plurality of electronic devices can each provide a data record, the apparatus comprising:
a processor configured to:
receive initial data records from initiating electronic devices of the plurality of electronic devices;
determine a geographical location of each of the initiating electronic devices;
define a contribution area for each initial data record based on at least one of:
a) the geographical location of an event or the geographical location of a corresponding initiating electronic device; and
b) the distance between the event or corresponding initiating electronic device and a contributing second electronic device;
receive contributing data records from contributing electronic devices of the plurality of electronic devices;
determine the geographical location of each of the contributing electronic devices;
form plural combined data records for publication and display on electronic devices of the plurality of electronic devices, wherein each combined data record is formed by combining one or more contributing data records that are received from the contributing electronic devices with one of the initial data records received from the initiating electronic devices;
wherein forming each of the plural combined data records comprises determining if the determined geographic location of a particular contributing electronic device is within the contribution area for a particular initial data record, and if so, including a contributing data record from that particular contributing electronic device in the combined data record for that particular initial data record;
define a geographical restriction area, and a combined data record limit for the geographical restriction area
limit the number of different combined data records for publication and display that can be generated from initial data records in the defined geographical restriction area such that when the combined data record limit is reached, no more combined data records are generated from initial data records from initiating electronic devices that have a geographical location within the defined geographic restriction area; and
publish the combined data records such that electronic devices of the plurality of electronic devices can access and display the combined data records.

11. An apparatus as claimed in claim 10 wherein the processor is configured to perform at least one of:
selectively allowing an electronic device to perform at least one of generating or providing a data record for inclusion in the combined data record based on the geographical location of that electronic device; or
selectively preventing an electronic device from performing at least one of generating or providing a data record for inclusion in the combined data record based on the geographical location of that electronic device.

12. An apparatus as claimed in claim 10 wherein the inclusion of a data record in the combined data record is based on at least one of:
the proximity of the electronic device that provided the data record to an event location; or
the data record being provided during a predefined period of time.

13. An apparatus as claimed in claim 10, wherein:
the inclusion of a data record in the combined data record is based on whether or not the geographical location of the electronic device that provided the data record is within a defined geographical contribution area.

14. An apparatus as claimed in claim 10 wherein the processor is configured to:
for a given electronic device, allow or deny access to the combined data record based on the geographical location of the given electronic device.

15. An apparatus as claimed in claim 10 wherein the processor is configured to: perform one or more of:

at least one of ordering or publishing the data records for the combined data record based on the number of accesses made to each of the data records in the combined data record by electronic devices;

at least one of ordering or publishing the data records for the combined data record based on a rating associated with each of the data records in the combined data record;

at least one of ordering or publishing the data records for the combined data record based on the order in which each of the data records in the combined data record are provided or received;

at least one of ordering or publishing the data records for the combined data record based on the geographical location of the electronic device that provided each of the data records in the combined data record.

16. An apparatus as claimed in claim 10 wherein:
the electronic devices are portable communication devices.

17. An apparatus as claimed in claim 10 wherein the apparatus is an electronic device of the system and/or is a server of the system.

18. An apparatus as claimed in claim 10 wherein the processor is configured to perform at least one of:
for a given electronic device, allowing or denying access to one or more of the combined data records based on the geographical location of the given electronic device; or
for a given electronic device, selecting an order of display of the combined data records for the given electronic device based on at least one of the geographical location of the given electronic device or the respective geographical locations associated with each of the combined data records.

19. An apparatus as claimed in claim 10 wherein:
the inclusion of a data record in the combined data record is based on at least one of image or video orientation data that is associated with that data record.

20. A system for generating a combined data record for publication or display comprising:
a plurality of electronic devices for providing data records; and
an apparatus comprising a processor configured to:
receive initial data records from initiating electronic devices of the plurality of electronic devices;
determine a geographical location of each of the initiating electronic devices;
define a contribution area for each initial data record based on at least one of:
a) the geographical location of an event or the geographical location of a corresponding initiating electronic device; and
b) the distance between the event or corresponding initiating electronic device and a contributing second electronic device;
receive contributing data records from contributing electronic devices of the plurality of electronic devices;
determine the geographical location of each of the contributing electronic devices;
form plural combined data records for publication and display on electronic devices of the plurality of electronic devices, wherein each combined data record is formed by combining one or more contributing data records that are received from the contributing electronic devices with one of the initial data records received from the initiating electronic devices;
wherein the forming each of the plural combined data records comprises determining if the determined geographic location of a particular contributing electronic device is within the contribution area for a particular initial data record, and if so, including a contributing data record from that particular contributing electronic device in the combined data record for that particular initial data record;
define a geographical restriction area, and a combined data record limit for the geographical restriction area; and
limit the number of different combined data records for publication and display that can be generated from initial data records in the defined geographical restriction area such that when the combined data record limit is reached, no more combined data records are generated from initial data records from initiating electronic devices that have a geographical location within the defined geographic restriction area; and
publish the combined data records such that electronic devices of the plurality of electronic devices can access and display the combined data records.

21. A non-transitory computer readable storage medium storing computer software code that, when the code is run on a data processor of a system comprising a plurality of electronic devices that can each provide a data record, the software code performs a method comprising:
receiving initial data records from initiating electronic devices of the plurality of electronic devices;
determining a geographical location of each of the initiating electronic devices;
defining a contribution area for each initial data record based on at least on of:
a) the geographical location of an event or the geographical location of a corresponding initiating electronic device; and
b) the distance between the event or corresponding initiating electronic device and
a contributing second electronic device;
receiving contributing data records from contributing electronic devices of the plurality of electronic devices;
determining the geographical location of each of the contributing electronic devices;
forming plural combined data records for publication and display on electronic devices of the plurality of electronic devices, wherein each combined data record is formed by combining one or more of the contributing data records that are received from the contributing electronic devices with one of the initial data records received from the initiating electronic devices;
wherein the forming each of the plural combined data records comprises determining if the determined geographic location of a particular contributing electronic device is within the contribution area for a particular initial data record, and if so, including a contributing data record from that particular contributing electronic device in the combined data record for that particular initial data record;
defining a geographical restriction area, and a combined data record limit for the geographical restriction area;
limiting the number of different combined data records for publication and display that can be generated from initial data records in the defined geographical restriction area such that, when the combined data record limit is reached, electronic devices that have a geographical location within the restriction area cannot provide further initial data records to initiate further different combined data records for publication and display; and publishing the combined data records such that electronic devices of the plurality of electronic devices can access and display the combined data records.

22. A method as claimed in claim 1 wherein the inclusion of a contributing data record in the combined data record is based on the proximity of the electronic device that provided the contributing data record to an initiating electronic device that provides the initial data record for the combined data record.

23. An apparatus as claimed in claim 10 wherein the inclusion of a contributing data record in the combined data record is based on the proximity of the electronic device that provided the data record to an initiating electronic device that provides the initial data record for the combined data record.

24. A method as claimed in claim 1 further comprising:
limiting the number of combined data records that can be generated during a predefined period of time such that when the limit is reached, no more combined data records can be generated during that time period.

25. An apparatus as claimed in claim 10 wherein the processor is further configured to:
limit the number of combined data records that can be generated during a predefined period of time such that when the limit is reached, no more combined data records can be generated during that time period.

* * * * *

UNITED STATES PATENT AND TRADEMARK OFFICE
CERTIFICATE OF CORRECTION

PATENT NO. : 10,204,115 B2
APPLICATION NO. : 14/127880
DATED : February 12, 2019
INVENTOR(S) : Simon Edwards Page 1 of 1

It is certified that error appears in the above-identified patent and that said Letters Patent is hereby corrected as shown below:

In the Claims

Column 38, Line 37 (Claim 21, Line 11), please change "least on" to -- least one --.

Signed and Sealed this
Seventeenth Day of September, 2019

Andrei Iancu
*Director of the United States Patent and Trademark Office*